June 22, 1948.  B. E. LENEHAN  2,443,661
GAUGE SYSTEM FOR MEASURING SMALL VARIATIONS IN DIMENSIONS
Filed Aug. 10, 1944
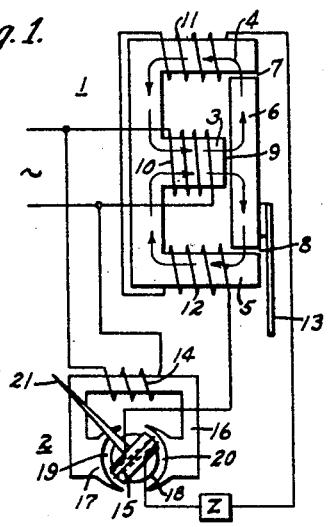
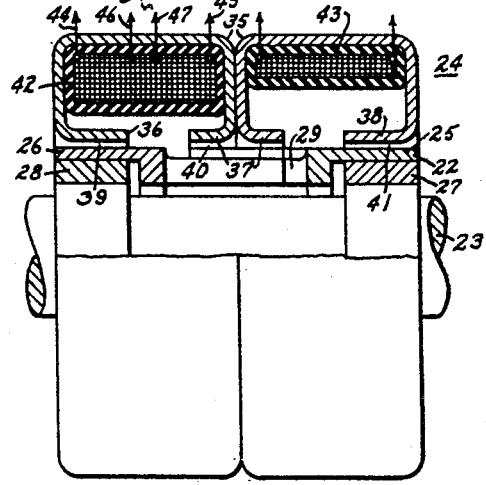
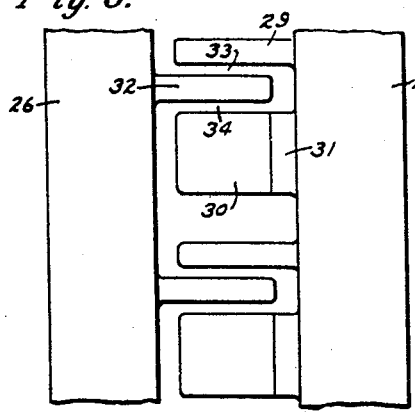
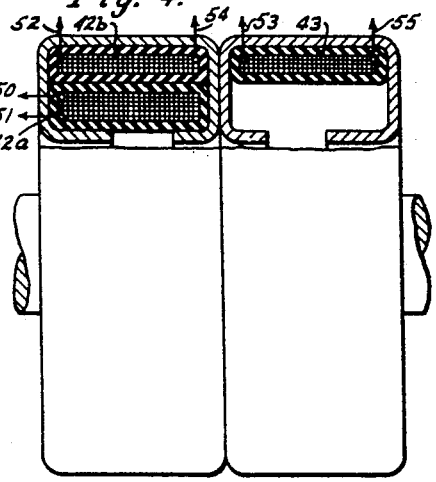
WITNESSES:
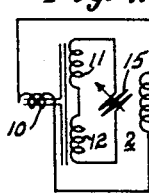
Leon M. Garman
C. F. Oberheim.
INVENTOR
Bernard E. Lenehan.
BY
Paul E. Friedemann
ATTORNEY
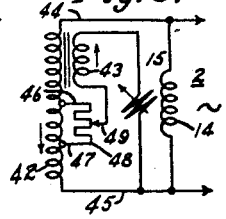

Patented June 22, 1948

2,443,661

UNITED STATES PATENT OFFICE 2,443,661

GAUGE SYSTEM FOR MEASURING SMALL VARIATIONS IN DIMENSIONS

Bernard E. Lenehan, Bloomfield, N. J., assignor to Westinghouse Electric Corporation, East Pittsburgh, Pa., a corporation of Pennsylvania Application August 10, 1944, Serial No. 548,886

5 Claims. (Cl. 177—351)

This invention relates, generally, to electrical measuring devices and, more particularly, to measuring devices of the type which are useful in determining changes in physical dimension of a body. This invention is particularly useful in the field of electric gauging wherein, for example, it is desired to obtain indications of changes from a standard dimension in the thickness of sheet steel and the like, and it is also useful in the field of strain measurement wherein indications of the strain of test specimens or objects resulting from applied stresses, are desired.

This invention utilizes electromagnetic devices having relatively movable magnetic elements for detecting the change in physical dimension of a body. In general, the operating energy level of such devices is high when compared, for example, to the magnetostrictive types of strain sensitive devices. The energy level, however, is not sufficiently high to tolerate errors in the gauging device as a whole resulting from such changes as fluctuations in the supply potential for the device.

Ordinarily, electrical measuring instruments having spring-biased moving elements are utilized to indicate the electrical quantity indicative of the physical change. Such instruments, however, have been found undesirable for the reason the spring tension is independent of any electrical changes which may occur in the system. Thus, for example, an electrical quantity indicative of a given physical change at a given value of supply potential will produce a corresponding scale deflection of the indicating instrument. However, should the supply potential for some reason drop slightly in value, for the same physical change, a smaller electrical quantity is obtained. Thus, the magnetic forces of the instrument are diminished and the scale deflection of the instrument drops to some smaller value. Hence, an error is introduced which renders the indications of the instrument unreliable.

Accordingly, it is a broad object of this invention to provide an electrical measuring device which is independent of fluctuations in supply potential.

Another broad object of this invention is to provide an electrical measuring device for indicating physical changes, which utilizes the ratio of the supply potential and the electrical quantity indicative of the strain to provide an indication of the physical change.

A specific object of this invention is to provide an electric gauge embodying an indicating instrument in which the moving element thereof is mechanically unrestrained.

Another specific object of this invention is to provide an electric gauge embodying an electrical measuring instrument in which the actuating and restraining forces acting on the moving element thereof are primarily magnetic.

Another specific object of this invention is to provide an electric gauge supplied by alternating currents which embodies a simple alternating-current ratio type instrument for indicating the electrical quantities of the gauge.

Other objects and advantages will become more apparent from a study of the following disclosure when considered in conjunction with the accompanying drawings in which:

Figure 1 is a schematic diagram of an electric gauge embodying the fundamental principles of this invention;

Fig. 2 is a partial longitudinal sectional view of an electromagnetic device for sensing shaft strain;

Fig. 3 is a developed view of the rotor assembly of the device of Fig. 2;

Fig. 4 illustrates a modification of the stationary coil assembly of the device of Fig. 2;

Fig. 5 is a diagrammatic showing of an electrical measuring device embodying a strain-sensitive pickup such as shown in Fig. 2;

Fig. 6 is a diagrammatic showing of an electrical measuring device embodying a strain-sensitive pickup such as illustrated in Fig. 4;

Fig. 7 diagrammatically illustrates a modification of the circuit arrangement illustrated in Fig. 1, and;

Fig. 8 diagrammatically illustrates a modification of the circuit arrangement illustrated in Fig. 6.

In Fig. 1 of the drawings, an electric gauge is illustrated which may be utilized to measure the thickness of metal plates or to follow dimensional changes in a body. It comprises, generally, an electromagnetic device, generally indicated at 1, and an indicating instrument generally indicated at 2. The electromagnetic device, which comprises a substantially E-shaped core section, having a short center leg 3 and the outside legs 4 and 5 which are of slightly longer dimension than the center leg, has an armature member 6 disposed for movement between the outside legs 4 and 5 such that its extremities form, with the outside legs, the variable air gaps 7 and 8, and its central section forms, with a center leg 3, the air gap 9 which is not changed in magnetic characteristic by armature movements. An exciting winding 10 is wound about the center leg 3 and a pair of secondary windings 11 and 12 are respectively wound about the legs 4 and 5. The exciting winding 10 is connected to a suitable source of alternating current, indicated generally by the sinusoidal wave and produces an alternating magnetic flux which, for example, links the magnetic circuit in the instantaneous directions indicated by the arrows. The windings 11 and 12 are preferably identical, that is, each winding has the same electrical properties. Thus it will be seen that upon movement of the armature member 6 by reason of a force application to the prod 13, the air gap 7, for example, will be decreased and the air gap 8 increased to produce a change in reluctance of the magnetic circuits associated with the coils 11 and 12, the reluctance of the magnetic circuit associated with the coil 11 decreasing, and the reluctance of the magnetic circuit associated with the coil 12 increasing, thereby producing an opposite change in the flux linkages of the coils, and as a consequence, an unbalance of the voltages induced therein.

The indicating instrument 2 comprises a stationary winding 14 and a pivoted winding 15. These windings are linked in the usual manner by a magnetic circuit which includes the iron core structure 16 having the arcuate extremities 17 and a core 18 concentrically disposed between the arcuate surfaces, thereby forming the arcuate air gaps 19 and 20. The movable coil 15 is pivotally mounted about the axis of the core 18 such that its coil sides, upon angular movement of this coil, move through the arcuate air gaps 19 and 20.

There are no restraining springs biasing the movable coil to its zero indication position. The actuating and restraining forces acting thereon being primarily, if not entirely magnetic. Electrical currents are conducted to the moving coil through the medium, for example, of dead soft gold conducting spirals which, in the ideal case, in no wise mechanically bias the moving or pivoted coil. Thus any turning moments acting on the moving coil as a result of conducted currents therein must be opposed by counter turning moments resulting from induced currents in the coil.

As shown, the stationary winding 14 is connected to the source of alternating current and the movable winding 15 is connected in series with the secondary windings 11 and 12, which windings are in turn connected in series opposed relationship. By reason of these connections the magnetizing coils of the instrument and the electromagnetic device have in phase voltages applied thereacross. Thus with properly matched impedances the induced and conducted currents in the moving coil 15 are 180° out of phase for any angular position of this coil. A suitable impedance as Z having any suitable impedance value including zero may be utilized to achieve this condition.

Assuming that the armature member 6 is in an intermediate position such that the air gaps 7 and 8 are equal, it will be apparent that voltages induced in the secondary windings 11 and 12 are equal and in opposition. Thus, the voltage conductively applied across the movable coil 15 by the electromagnetic device is zero. Under these conditions, voltages which are induced in the movable winding 15 by the alternating magnetic flux circulating in the magnetic circuit of the meter cause induced currents to flow in such a direction as to produce an induced magnetic field which reacts with the main magnetic field to effect turning of the movable coil until the induced voltage drops in effect to zero. At such a point the mutual induction of the stationary and moving coils of the instrument is a minimum value. This is the position in which the pointer 21 is substantially in a vertical position. Any tendency of the pivoted coil to depart from this position in either direction produces an induced magnetic field thereabout, which reacts with the main magnetic field to restore the coil to its original position. The principle here is similar to a two-pole single-phase induction motor having a drum wound armature. The turning moments acting on the armature and the magnetic reactions causing the turning moments at standstill are analogous to those of the present indicating instrument.

If now the prod 13 is moved in accordance with a change in physical dimension, an unbalance of the alternating magnetic fluxes linking the secondary windings 11 and 12 occurs. A conducted differential voltage therefor appears across the pivoted coil 15 causing it to rotate from its center position in one direction or the other, depending upon the instantaneous direction of the applied voltage with respect to the instantaneous magnetic field of the instrument. As the coil moves angularly, its turns are linked by more of the main magnetic field of the instrument, and the induced voltages increase in magnitude until they are in effect equal and opposed to the applied voltage, at which time the magnetic field about the coil resulting from the induced and conducted currents in the coil is substantially zero. As a result, the turning force applied to the coil by the reaction of the magnetic fields about the coil with the main magnetic field of the instrument is zero. If the air gaps 7 and 8 are changed in a reversed direction, it will be apparent that the instantaneous conducted currents in the coil and the resulting forces acting upon the coil will be reversed and will rotate the coil in an opposite direction until a position is reached in which the magnetic forces acting on the coil are again in substantial equilibrium.

There are several advantages inherent in a device of this type. The first and most important is: the fluctuations in voltage of the source of potential are automatically compensated. This will readily be seen when the magnetic fluxes linking the moving coil are considered. If the applied voltage should drop in value for a given value of unbalance of the air gaps 7 and 8, the useful output voltage of the electromagnetic device will drop. As a result, the magnetic field resulting from the conducted currents in the movable or pivoted coil decreases in value. At the same time, however, since the winding 14 is also connected to the source of electrical energy supplying the electromagnetic device, the magnetic field across the air gaps 19 and 20 also decreases in value. Thus, the induced magnetic field linking the coil 15 and the magnetic field resulting from the conducted currents in the coil 15 change in proportional amounts and no change in deflection of the pointer 21 occurs.

A second advantage resides in the elimination of electrical rectifiers commonly used in alternating current devices embodying ratio instruments. Such instruments are usually provided with a permanent magnet field and, as a result, must have the moving elements thereof energized with unidirectional flows of current. In most such applications, electrical rectifiers, particularly copper-oxide types of rectifiers, are not satisfactory since their electrical resistance is measurably effected by changes in temperature, and by changes in the magnitudes of the currents flowing therethrough. Thus their elimination improves the inherent accuracy of the device.

In Fig. 2 there is illustrated a type of electromagnetic device which is useful for sensing the torsional strain of a shaft. In general, this device comprises a rotor assembly 22 which is securely mounted to rotate with a shaft 23. The rotor assembly comprises the two torque rings 25 and 26 which are respectively mounted upon the nonmagnetic bushings 27 and 28. Projecting from the torque ring 25 is a finger member or projection 29, as will be more clearly seen in the developed view of the rotor illustrated in Fig. 3. Circumferentially displaced from the finger 29 is the segment 30 which is preferably a ring segment, the outside diameter of which is the same, although not necessarily so, as that of the torque rings 25 and 26. This ring segment is securely mounted to the torque ring 25 by means of a nonmagnetic spacer 31. A finger member 32 projects from the torque ring 26 between the finger member 29 and the ring segment 30. This assembly is such that circumferential air gaps 33 and 34, having similar magnetic characteristics, are formed therebetween. A suitable number of these finger and segment assemblies continue around the perimeter of the rotor member. It will be understood that one of such finger and segment assemblies is sufficient to achieve the necessary magnetic flux changes. However, for the purpose of magnetically balancing the rotor assembly, and possibly increasing the flux capacity of the device, and at the same time effecting a better flux distribution, a plurality of these assemblies is probably desirable.

The stationary member 24 comprises the magnetic housing 35 which is formed in two sections and provided with the flanged extremities 36, 37 and 38, which form, with the cooperating peripheral surfaces of the torque rings 25 and 26 and the ring segments 30, the air gaps 39, 40 and 41 having stable magnetic characteristics whether the rotor is rotating or stationary. A main winding 42 is provided in the left-hand section of the housing as viewed in the drawing, and a secondary winding 43 is provided in the right-hand section. These windings may be connected in a suitable circuit such as, for example, that illustrated in Fig. 5 in which the coil leads 44 and 45 of the main winding 42 are connected across the source of alternating current. The leads 46 and 47 have connected thereacross a resistor element 48 which is provided with a slider such as 49. With this arrangement, a tapped portion of the main winding 42 is connected in series with the winding 43, and a suitable indicating instrument such as 2 is utilized to measure the differential of the voltages generated in the tapped portion of the main winding 42 and the winding 43.

As will be apparent from Fig. 3, the magnetic circuit of this device has two paths through the rotor assembly and through the stationary member. One of these paths, referring now to both Figs. 2 and 3, begins with the left-hand section of the magnetic housing and includes the air gap 39, the torque ring 26, the finger member 32, the air gap 33, the finger member 29, the torque ring 25 and the air gap 41 to the right-hand section of the housing and thence through the abutting surfaces of the housing to the left-hand section thereof. The other path begins again with the left-hand section of the housing, the air gap 39, the torque ring 26, the finger 32, the air gap 34, the ring segment 30 and thence across the air gap 40 to the other side of the left-hand housing section.

Thus it will be seen that upon torsional deflection of the shaft due to clockwise torque from left to right of the shaft, the air gaps 34 will be decreased while at the same time the air gaps 33 will be increased. This unbalances the magnetic fluxes in the parallel magnetic circuits, the magnetic fluxes linking the main winding 42 increasing, and the magnetic fluxes linking the winding 43 decreasing. Thus in effect, the impedance of the winding 42 increases, while in effect, the impedance of the winding 43 decreases.

It will be apparent from the metering circuit illustrated in Fig. 5 that the voltages induced by the inductive coupling of the windings in the winding 43 are 180° out of phase with the voltage of the main winding 42, by reason of the fact the winding 43 is inductively energized by the winding 42. Thus, when these windings are connected as shown, in series, the currents flowing in the circuit of the movable element 15 of the indicating instrument are in opposition. For zero torque of the shaft these currents may be made effectively equal in value, and at the same time the coil impedances matched by adjustment of the resistor slider 49 along the resistor 48. Thus at zero torque of the shaft, a zero indication of the indicating instrument is obtained. For the assumed condition of torque, however, and the corresponding impedance unbalances of the coils that follows, the magnitudes of the opposed currents are no longer the same. As a result, a deflection of the indicating instrument occurs in the direction of the voltage unbalance of the coils.

The modification of the device of Fig. 2, illustrated in Fig. 4, utilizes the type of rotor assembly illustrated in the device of Fig. 2 as shown in developed form in Fig. 3. Hence a discussion of the magnetic circuits and their response to torsional strain is believed unnecessary. The only change in Fig. 4 over Fig. 2 resides in the use of two coils in the left-hand housing section, of which the coil 42a is the primary winding. It will be apparent from the discussion of Fig. 2 that both the secondary coils 42b and 43 of Fig. 4 are linked by the magnetic flux produced by the winding 42a. By connecting these windings, as diagrammatically illustrated in Fig. 6, with the terminals 50 and 51 of the primary winding 42a across the source of alternating potential, the terminal 52 of the winding 42b with the terminal 53 of the winding 43 and the terminals 54 and 55, respectively, of the windings 42b and 43 across the pivoted coil 15 of the indicating instrument, opposed electrical quantities are applied across the movable coil 15 of the indicating instrument 2. Thus at zero torque of the shaft a zero indication of the instrument occurs. Voltage unbalances of the coils produce a deflection of the instrument in the corresponding direction.

The modification of the invention of Fig. 1 illustrated in Fig. 7 connects the stationary winding 14 of the indicating instrument in series with the exciting winding 10 of the electromagnetic device. The function of the system of Fig. 7 is otherwise the same as that of Fig. 1. Similarly in Fig. 8 the stationary instrument winding 14 and the primary winding 42a are connected in series and thus represents a modification of the parallel connections shown in Fig. 6. Here again the function is unchanged by the different connections.

The foregoing disclosure and the showings made in the drawings are merely illustrative of the principles of this invention and are not to be considered in a limiting sense. The only limitations are to be determined from the scope of the appended claims.

I claim as my invention:

1. Apparatus for determining a change in physical dimension of a body comprising, in combination, a pair of parallel magnetic circuits including a movable armature disposed to oppositely vary the reluctances of the parallel magnetic circuits upon movement thereof, means for moving said armature depending upon a change in physical dimension of a body, exciting winding means disposed to be linked by both said parallel magnetic circuits, a pair of secondary windings, each disposed in one of said parallel magnetic circuits to be linked thereby so that each of the parallel magnetic circuits links one of said secondary windings, an indicating instrument having a single stationary exciting coil, a movable coil and a magnetic circuit linking both of said coils, said movable coil being mechanically unrestrained, circuit means connecting said pair of secondary windings in series opposed relation and in series with said movable coil, a pair of circuit terminals adapted for connection to a source of alternating current potential, circuit means connecting said exciting winding means across said circuit terminals, and circuit means connecting said stationary exciting coil of the indicating instrument across said circuit terminals.

2. Apparatus for determining a change in physical dimension of a body comprising, in combination, a pair of parallel magnetic circuits including a movable armature disposed to oppositely vary the reluctances of the parallel magnetic circuits upon movement thereof, means for moving said armature depending upon a change in physical dimension of a body, exciting winding means disposed to be linked by both said magnetic circuits, a pair of secondary windings, each disposed in one of said parallel magnetic circuits to be linked thereby so that each of the parallel magnetic circuits links one of said secondary windings, an indicating instrument having a single stationary exciting coil, a movable coil and a magnetic circuit linking both of said coils, said movable coil being mechanically unrestrained, circuit means connecting said pair of secondary windings in series opposed relation and in series with said movable coil, an impedance element connected in series in the circuit including said movable coil, a pair of circuit terminals adapted for connection to a source of alternating current potential, circuit means connecting said exciting winding means across said circuit terminals, and circuit means connecting said stationary exciting coil of the indicating instrument across said circuit terminals.

3. Apparatus for determining a change in physical dimension of a body comprising, in combination, a pair of parallel magnetic circuits including a movable armature disposed to oppositely vary the reluctances of the parallel magnetic circuits upon movement thereof, means for moving said armature depending upon a change in physical dimension of a body, exciting winding means disposed to be linked by both of said parallel magnetic circuits, a pair of secondary windings, each disposed in one of said parallel magnetic circuits to be linked thereby so that each of the parallel magnetic circuits links one of said secondary windings, an indicating instrument having a single stationary exciting coil, a movable coil and a magnetic circuit linking both of said coils, said movable coil being mechanically unrestrained, circuit means connecting said pair of secondary windings in series opposed relation and in series with said movable coil, a pair of circuit terminals adapted for connection to a source of alternating current potential, and circuit means connecting said exciting winding means and said stationary exciting coil of the indicating instrument in series circuit relationship across said circuit terminals.

4. Apparatus for determining a change in physical dimension of a body comprising, in combination, an electric gauge having a pair of magnetic circuits, means for oppositely varying the reluctances of said magnetic circuits in response to a change in physical dimension of said body, a pair of windings one disposed in each magnetic circuit to be linked thereby so that each magnetic circuit has a winding associated therewith, exciting winding means for said electric gauge for producing a magnetic flux in both of said magnetic circuits, an indicating instrument including a stationary exciting coil, a movable coil and a magnetic circuit linking both of said coils, said movable coil being mechanically unrestrained, circuit means connecting said pair of windings in series opposed relation and in series with said movable coil, and circuit means for connecting the exciting winding means of said electric gauge and the exciting coil of said indicating instrument to a supply of alternating current.

5. Apparatus for determining a change in physical dimension of a body comprising, in combination, a pair of windings, a magnetic circuit for each winding, excitation means for both of said pair of windings, means forming a part of the magnetic circuit for each of said pair of windings and responsive to a change in physical dimension of said body for oppositely varying the reluctances of said magnetic circuits, an indicating instrument having a stationary exciting coil, a movable coil and a magnetic circuit linking both of said coils, said movable coil being actuated only by magnetic effects in said instrument, circuit means connecting said pair of windings in series opposed relation and in series with said movable coil, and circuit means for connecting said excitation means and said stationary exciting coil to a single supply of alternating current.

BERNARD E. LENEHAN.

REFERENCES CITED

The following references are of record in the file of this patent:

UNITED STATES PATENTS

| Number | Name | Date |
|---|---|---|
| 1,131,202 | Boyden | Mar. 9, 1915 |
| 2,093,204 | Miyazaki | Sept. 14, 1937 |
| 2,206,416 | Mathes | July 2, 1940 |
| 2,240,184 | Hathaway | Apr. 29, 1941 |
| 2,394,079 | Langer et al. | Feb. 5, 1946 |
| 2,420,539 | Hornfeck | May 13, 1947 |